United States Patent
Sakurada et al.

(10) Patent No.: US 11,631,326 B2
(45) Date of Patent: Apr. 18, 2023

(54) INFORMATION PROVIDING SYSTEM, SERVER, ONBOARD DEVICE, VEHICLE, STORAGE MEDIUM, AND INFORMATION PROVIDING METHOD

(71) Applicant: TOYOTA JIDOSHA KABUSHIKI KAISHA, Toyota (JP)

(72) Inventors: Shin Sakurada, Toyota (JP); Jun Okamoto, Nagoya (JP); Josuke Yamane, Nissin (JP); Risako Yamamoto, Toyota (JP); Kazuki Sugie, Toyota (JP); Masatoshi Komiyama, Handa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 250 days.

(21) Appl. No.: 16/684,701

(22) Filed: Nov. 15, 2019

(65) Prior Publication Data
US 2020/0175863 A1    Jun. 4, 2020

(30) Foreign Application Priority Data

Nov. 29, 2018    (JP) .............................. JP2018-224113

(51) Int. Cl.
*G06N 20/00*    (2019.01)
*G01C 21/32*    (2006.01)
(Continued)

(52) U.S. Cl.
CPC ....... *G08G 1/096775* (2013.01); *G06V 20/58* (2022.01); *G08G 1/0112* (2013.01);
(Continued)

(58) Field of Classification Search
CPC .... G08G 1/166; G08G 1/0133; G08G 1/0112; G08G 1/096725; G08G 1/164;
(Continued)

(56) References Cited

U.S. PATENT DOCUMENTS

| | | | | |
|---|---|---|---|---|
| 2018/0259966 A1* | 9/2018 | Long | .................... | G05D 1/0274 |
| 2019/0362159 A1* | 11/2019 | Cooley | .................. | H04L 67/18 |
| 2020/0079368 A1* | 3/2020 | Yamada | ................. | G08G 1/166 |

FOREIGN PATENT DOCUMENTS

| | | | | |
|---|---|---|---|---|
| CN | 103900572 A | * | 7/2014 | ......... G01C 21/3446 |
| JP | 2008-234044 A | | 10/2008 | |

(Continued)

*Primary Examiner* — Maceeh Anwari
*Assistant Examiner* — Aarron E Santos
(74) *Attorney, Agent, or Firm* — Oblon, McClelland, Maier & Neustadt, L.L.P.

(57) ABSTRACT

An information providing system includes a server and an onboard device configured to transmit and receive information to and from the server. The onboard device includes an imaging unit configured to capture an image around a vehicle and a first transmission unit configured to transmit position information and captured image data to the server. The server includes a removal state information generating unit configured to generate removal state information including a predicted time which is required to remove the road obstacle based on the captured image data and a second transmission unit configured to transmit the removal state information. The removal state information which is transmitted from the server is output in another onboard device.

15 Claims, 9 Drawing Sheets

23

| ROAD OBSTACLE TYPE | REMOVAL STATE | PREDICTED TIME |
|---|---|---|
| NOT APPLICABLE | NOT APPLICABLE | 0 HOURS |
| DAMAGED VEHICLE | PROGRESS LEVEL 0 | 5 HOURS |
| | PROGRESS LEVEL 1 | 2.5 HOURS |
| | PROGRESS LEVEL 2 | 0.5 HOURS |
| FALLEN ROCKS | PROGRESS LEVEL 0 | 6 HOURS |
| | PROGRESS LEVEL 1 | 3 HOURS |
| | PROGRESS LEVEL 2 | 1.5 HOURS |
| SNOW ACCUMULATION | PROGRESS LEVEL 0 | 4 HOURS |
| | PROGRESS LEVEL 1 | 2 HOURS |
| | PROGRESS LEVEL 2 | 0.5 HOURS |
| ⋮ | ⋮ | ⋮ |

71 — 72 — 73

(51) Int. Cl.
*G08G 1/0967* (2006.01)
*G08G 1/01* (2006.01)
*G08G 1/127* (2006.01)
*G06V 20/58* (2022.01)

(52) U.S. Cl.
CPC ......... *G08G 1/0133* (2013.01); *G08G 1/0141* (2013.01); *G08G 1/127* (2013.01)

(58) Field of Classification Search
CPC ........... G08G 1/0116; G08G 1/096758; G08G 1/096791; G08G 1/163; G08G 1/096783; G08G 1/0129; G08G 1/096844; G08G 1/0137; G08G 1/07; G08G 1/096827; G08G 1/162; G08G 1/167; G08G 1/16; G08G 1/0141; G08G 1/00; G08G 1/0145; G08G 1/096775; G08G 1/161; G08G 1/165; G08G 1/22; G08G 1/052; G08G 1/096741; G08G 1/133; G08G 1/0104; G08G 1/065; G08G 1/08; G08G 1/081; G08G 1/087; G08G 1/09623; G08G 1/096708; G08G 1/096716; G08G 1/0968; B60W 2554/00; B60W 30/09; B60W 2420/52; B60W 2420/42; B60W 2540/18; B60W 2540/10; B60W 2720/106; B60W 40/04; B60W 2540/22; B60W 10/08; B60W 2520/10; B60W 2554/801; B60W 2556/50; B60W 10/20; B60W 2720/10; B60W 30/16; B60W 50/0098; B60W 2540/12; B60W 2556/65; B60W 50/0097; B60W 30/182; B60W 40/09; B60W 50/14; B60W 10/18; B60W 2040/0818; B60W 2040/0872; B60W 2420/54; B60W 2530/10; B60W 2540/043; B60W 2555/60; B60W 30/0956; B60W 30/143; B60W 50/082; B60W 10/04; B60W 10/06; B60W 10/10; B60W 2540/26; B60W 2552/20; B60W 2554/80; B60W 2554/804; B60W 2556/00; B60W 2754/30; B60W 50/10; B60W 60/0051; B60W 2300/38; B60W 2520/16; B60W 2520/18; B60W 2552/00; B60W 2556/55; B60W 2720/24; B60W 30/095; B60W 30/18163; B60W 2520/105; B60W 2520/14; B60W 2540/30; B60W 2554/4041; B60W 2710/1005; B60W 30/14; B60W 50/08; B60W 50/16; B60W 60/0053; B60W 10/26; B60W 20/12; B60W 2510/244; B60W 2552/05; B60W 2552/15; B60W 2710/18; B60W 2720/103; B60W 2754/10; B60W 40/06; B60W 30/0015; B60W 2050/0028; B60W 2050/146; B60W 2520/28; B60W 2540/215; B60W 2552/35; B60W 2555/20; B60W 2710/081; B60W 2710/083; B60W 2720/30; B60W 30/025; B60W 30/04; B60W 30/146; B60W 30/162; B60W 40/12; B60W 50/00; B60W 50/087; B60W 60/001; B60W 10/026; B60W 10/11; B60W 10/119; B60W 10/196; B60W 10/22; B60W 20/00; B60W 20/13; B60W 20/20; B60W 20/30; B60W 2050/0013; B60W 2050/0019; B60W 2050/0029; B60W 2050/0031; B60W 2050/0037; B60W 2050/0039; B60W 2050/0041; B60W 2050/0071; B60W 2050/0083; B60W 2050/0096; B60W 2400/00; B60W 2510/0638; B60W 2510/0657; B60W 2510/1005; B60W 2510/1015; B60W 2510/1025; B60W 2510/104; B60W 2510/105; B60W 2510/182; B60W 2520/26; B60W 2530/16; B60W 2530/20; B60W 2554/406; B60W 2556/45; B60W 2710/0666; B60W 2710/10; B60W 2710/20; B60W 2710/244; B60W 30/00; B60W 30/02; B60W 30/08; B60W 30/0953; B60W 30/10; B60W 30/17; B60W 30/18; B60W 30/18054; B60W 30/18127; B60W 30/188; B60W 30/192; B60W 40/02; B60W 40/072; B60W 40/076; B60W 40/08; B60W 40/1005; B60W 60/0027; B60W 20/11; B60W 2050/0002; B60W 2050/0014; B60W 2050/0067; B60W 2300/15; B60W 2300/17; B60W 2510/20; B60W 2520/04; B60W 2520/12; B60W 2520/125; B60W 2552/30; B60W 2552/40; B60W 2554/20; B60W 2554/4029; B60W 2554/802; B60W 2555/40; B60W 2710/0644; B60W 2710/182; B60W 2710/202; B60W 2710/207; B60W 30/165; B60W 30/18145; B60W 30/18159; B60W 40/105; B60W 40/107; B60W 50/085; B60W 60/0011; B60W 60/0016; B60W 60/0017; B60W 60/00272; G06N 20/00; G06N 3/006; G06N 7/005; G06N 3/0454; G06N 3/08; G06N 5/048; H04W 4/02; H04W 4/024; H04W 4/44; H04W 4/46; H04W 12/03; H04W 12/06; H04W 12/08; H04W 12/50
See application file for complete search history.

(56) References Cited

FOREIGN PATENT DOCUMENTS

| | | | |
|---|---|---|---|
| JP | 2008234044 A | * | 10/2008 |
| JP | 2011-068308 A | | 4/2011 |
| JP | 2011068308 A | * | 4/2011 |

* cited by examiner

| ROAD OBSTACLE TYPE | REMOVAL STATE | PREDICTED TIME |
|---|---|---|
| NOT APPLICABLE | NOT APPLICABLE | 0 HOURS |
| DAMAGED VEHICLE | PROGRESS LEVEL 0 | 5 HOURS |
| | PROGRESS LEVEL 1 | 2.5 HOURS |
| | PROGRESS LEVEL 2 | 0.5 HOURS |
| FALLEN ROCKS | PROGRESS LEVEL 0 | 6 HOURS |
| | PROGRESS LEVEL 1 | 3 HOURS |
| | PROGRESS LEVEL 2 | 1.5 HOURS |
| SNOW ACCUMULATION | PROGRESS LEVEL 0 | 4 HOURS |
| | PROGRESS LEVEL 1 | 2 HOURS |
| | PROGRESS LEVEL 2 | 0.5 HOURS |
| ⋮ | ⋮ | ⋮ |

INFORMATION PROVIDING SYSTEM, SERVER, ONBOARD DEVICE, VEHICLE, STORAGE MEDIUM, AND INFORMATION PROVIDING METHOD

INCORPORATION BY REFERENCE

The disclosure of Japanese Patent Application No. 2018-224113 filed on Nov. 29, 2018 including the specification, drawings and abstract is incorporated herein by reference in its entirety.

BACKGROUND

1. Technical Field

The present disclosure relates to an information providing system, a server, an onboard device, a vehicle, a storage medium, and an information providing method.

2. Description of Related Art

A method of supporting driving of a vehicle in a traffic jam has been proposed. For example, Japanese Patent Application Publication No. 2011-068308 (JP 2011-068308 A) discloses a vehicle controller that determines a position of a preceding vehicle of a host vehicle relative to the head of a traffic jam, predicts behavior of the preceding vehicle based on the position of the preceding vehicle, and controls following travel of the host vehicle relative to the behavior of the preceding vehicle.

SUMMARY

However, with the technique disclosed in JP 2011-068308 A, although control of a host vehicle can be supported in a traffic jam, it is not easy for a user to ascertain a prospect of clearing of the traffic jam. When prediction accuracy of clearing of a traffic jam is low, a user may feel stress. Accordingly, there is room for improvement in prediction accuracy of clearing of a traffic jam.

Therefore, the present disclosure provides an information providing system and the like associated with prediction of clearing of a traffic jam that can improve prediction accuracy of clearing of a traffic jam to contribute to convenience for a user.

According to a first aspect of the present disclosure, there is provided an information providing system including: a server; and an onboard device configured to transmit and receive information to and from the server. The onboard device includes an imaging unit configured to capture an image around a vehicle and a first transmission unit configured to transmit position information and captured image data to the server. The server includes a removal state information generating unit configured to generate removal state information including a predicted time which is required to remove the road obstacle based on the captured image data and a second transmission unit configured to transmit the removal state information. The removal state information which is transmitted from the server is output in another onboard device. The removal state information may include a position of a road obstacle.

According to a second aspect of the present disclosure, there is provided a server including: a reception unit configured to receive position information and captured image data of a captured image around a vehicle, which is captured by an onboard device in a predetermined vehicle state, from the onboard device; a removal state information generating unit configured to generate removal state information including a predicted time which is required to remove a road obstacle based on the captured image data; and a transmission unit configured to transmit the removal state information to another onboard device.

According to a third aspect of the present disclosure, there is provided an onboard device of a vehicle including: an imaging unit configured to capture an image around the vehicle in a predetermined vehicle state; and a transmission unit configured to transmit to transmit position information and captured image data to a server. The server generates removal state information including a predicted time which is required to remove a road obstacle based on the captured image data and transmits the removal state information to another onboard device, and the removal state information is output in the other onboard device.

According to a fourth aspect of the present disclosure, there is provided an onboard device of a vehicle including: a reception unit configured to receive, from a server, removal state information, which includes a predicted time which is required to remove a road obstacle and which is generated based on captured image data received from another onboard device by the server; and an output unit configured to output the removal state information.

According to a fifth aspect of the present disclosure, there is provided the vehicle including the above onboard device.

According to a sixth aspect of the present disclosure, there is provided a non-transitory computer-readable storage medium configured to store a computer program causing a computer to perform: causing an onboard device to capture an image around a vehicle in a predetermined vehicle state; and causing the onboard device to transmit position information and captured image data to a server. The server generates removal state information including a predicted time which is required to remove a road obstacle based on the captured image data and transmits the removal state information to another onboard device and the other onboard device outputs the removal state information.

According to a seventh aspect of the present disclosure, there is provided a non-transitory computer-readable storage medium configured to store a computer program causing a computer to perform: causing an onboard device to receive, from a server, removal state information, which includes a predicted time which is required to remove a road obstacle and which is generated based on captured image data received from another onboard device by the server; and causing the onboard device to output the removal state information.

According to an eighth aspect of the present disclosure, there is provided an information providing method which is performed by a server and an onboard device configured to transmit and receive information to and from the server. The information providing method includes: causing the onboard device to transmit position information and captured image data around a vehicle to the server; causing the server to generate removal state information including a predicted time which is required to remove a road obstacle based on the captured image data; and causing the server to transmit the removal state information to another onboard device, the other onboard device outputting the removal state information.

With the information providing system and the like according to the present disclosure, it is possible to provide an information providing system and the like that can improve prediction accuracy of clearing of a traffic jam to contribute to convenience for a user.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Hereinafter, an embodiment of the present disclosure will be described with reference to the accompanying drawings.

Figure 1:
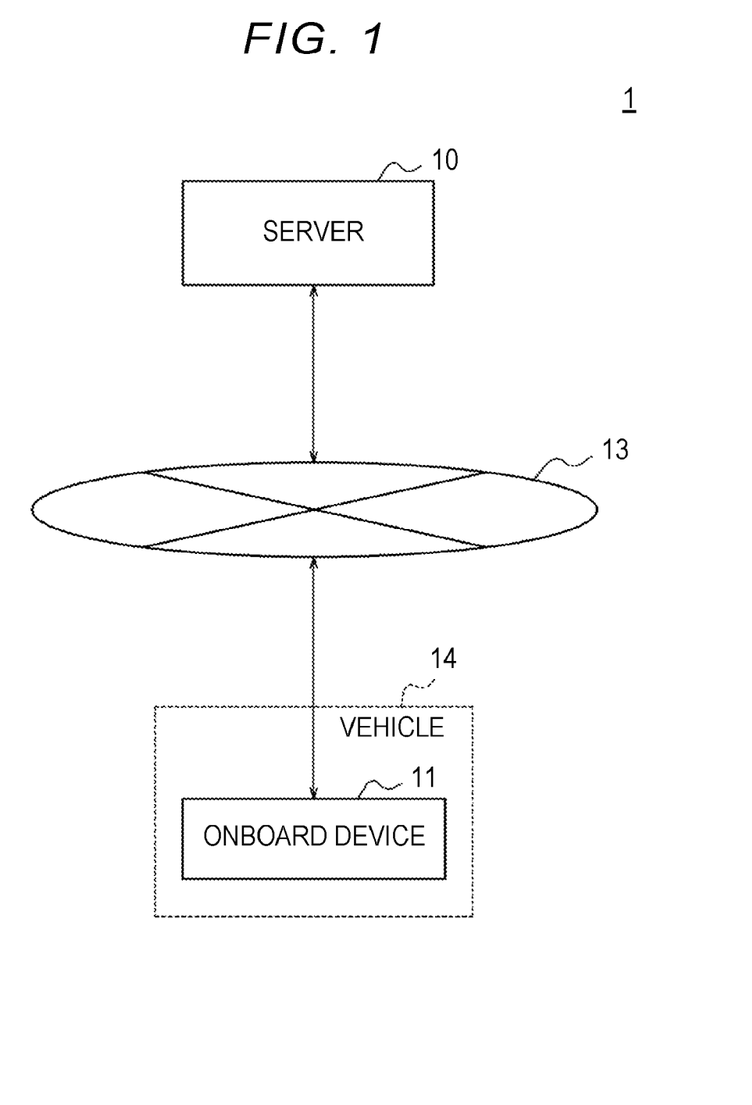
FIG. 1 is a diagram illustrating a configuration of an information providing system.

FIG. 1 is a diagram illustrating a configuration of an information providing system 1 according to an embodiment. The information providing system 1 includes a server 10 and an onboard device 11 that is mounted in a vehicle 14. The vehicle 14 is, for example, an automobile, but is not limited thereto and may be an arbitrary vehicle which a user can board. The onboard device 11 has one or both of a navigation function and an imaging function. The server 10 and the onboard device 11 are connected to transmit and receive data to and from each other via a network 13 in a wired or wireless manner. The information providing system 1 may include a plurality of onboard devices 11 which is mounted in a plurality of vehicles 14. In this configuration, the server 10 and the onboard device 11 transmit and receive a variety of information to and from each other.

The vehicle 14 may be caught in a traffic jam during travel. One reason for a traffic jam is lane blockade due to a road obstacle. In a traffic jam, the vehicle 14 exhibits specific vehicle states such as frequent use of a brake and low-speed traveling. By causing the onboard device 11 to image surroundings of the vehicle with such a vehicle state as a trigger, a road obstacle is imaged with a high probability. The server 10 collects captured image data from the vehicle 14 and generates removal state information including a predicted time until removal of a road obstacle is completed from the captured image data. Then, the server 10 transmits the removal state information to the onboard device 11. Then, the onboard device 11 outputs the removal state information. In this way, a user can ascertain the predicted time until removal of a road obstacle is completed from the removal state information, for example, using the results of imaging from other vehicles 14 via the server 10. With the information providing system 1, it is possible to enhance prediction accuracy for removal of a factor of a traffic jam. Accordingly, it is possible to enhance prediction accuracy of clearing of a traffic jam and thus to contribute to convenience for a user.

Figure 2:
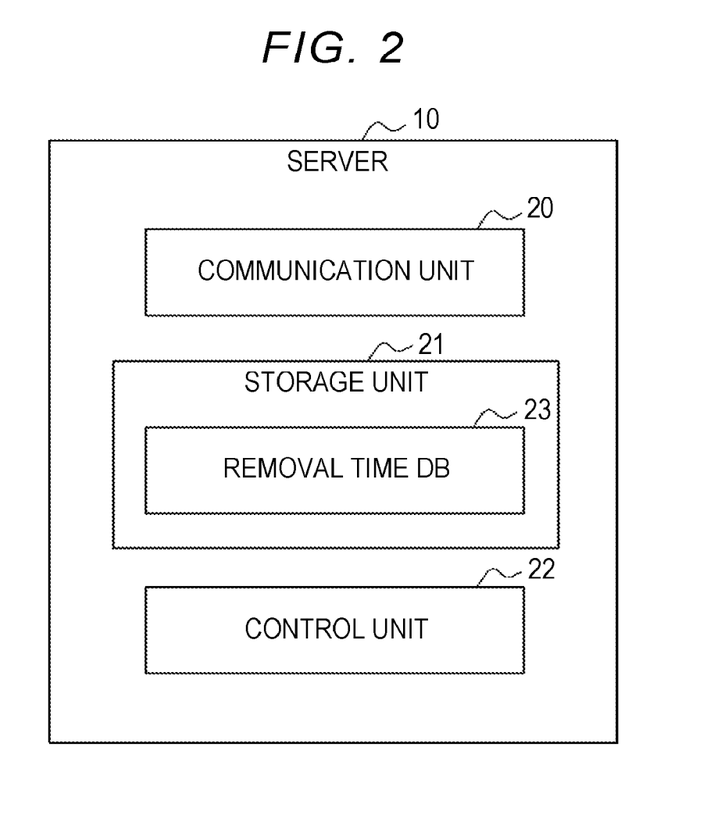
FIG. 2 is a diagram illustrating a configuration of a server.

FIG. 2 illustrates the configuration of the server 10. The server 10 includes a communication unit 20, a storage unit 21, and a control unit 22. The server 10 is a single computer or a plurality of computers that can communicate with each other.

The communication unit 20 includes one or more communication modules that are connected to the network 13. For example, the communication unit 20 may include a communication module corresponding to a wired local area network (LAN) standard. In this embodiment, the server 10 is connected to the network 13 via the communication unit 20.

The storage unit 21 includes one or more memories. Each memory included in the storage unit 21 may function as, for example, a main storage device, an auxiliary storage device, or a cache storage device. The storage unit 21 stores arbitrary information, control processing programs, and databases which are used for operation of the server 10. The storage unit 21 stores a removal time DB 23 including a time for removing a road obstacle. Details of the removal time DB 23 will be described later.

The control unit 22 includes one or more processors. Each processor is a general-purpose processor or a dedicated processor specialized in a specific process, but is not limited thereto. The control unit 22 controls the operation of the server 10 in accordance with a control processing program which is stored in the storage unit 21. The control unit 22 also has a clocking function of acquiring a current time.

Figure 3:
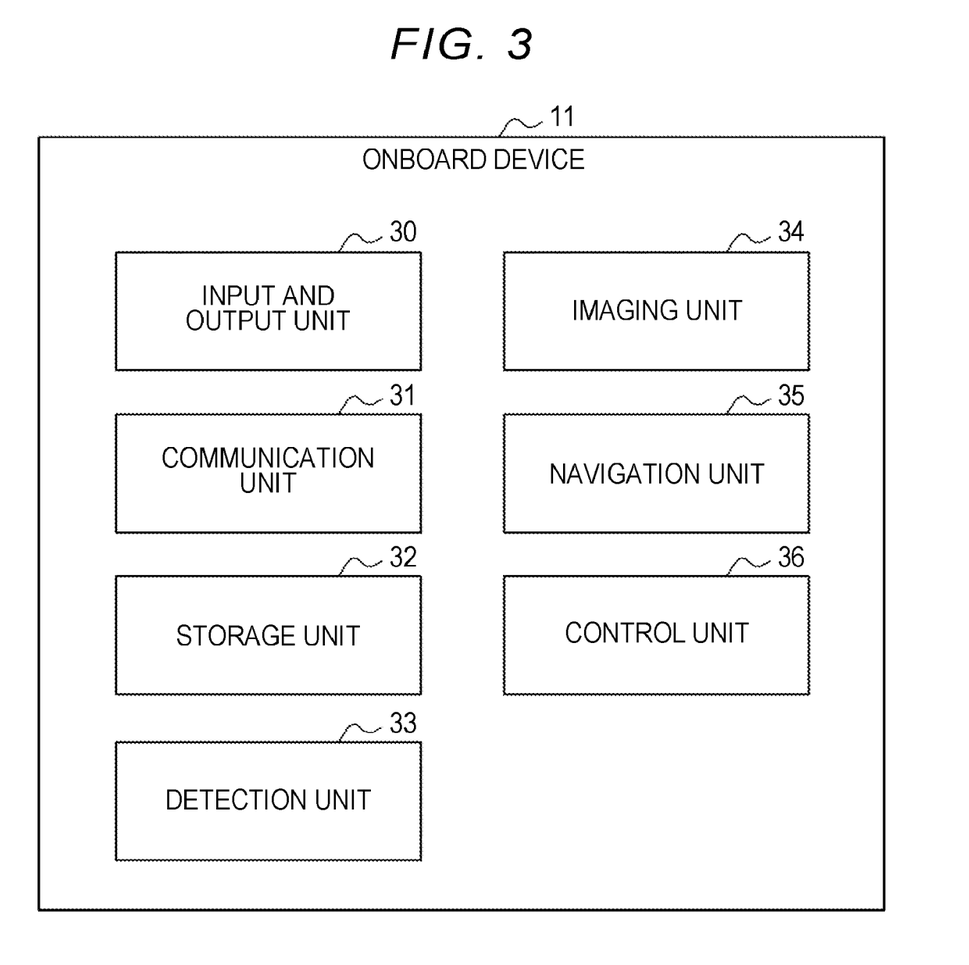
FIG. 3 is a diagram illustrating a configuration of an onboard device.

FIG. 3 illustrates the configuration of the onboard device 11. The onboard device 11 includes an input and output unit 30, a communication unit 31, a storage unit 32, a detection unit 33, an imaging unit 34, a navigation unit 35, and a control unit 36. The onboard device 11 may be a single device or may include a plurality of devices.

The input and output unit 30 includes an input interface that detects a user's input and supplies input information to the navigation unit 35, the control unit 36, and the like. The input interface includes, for example, physical keys, capacitive keys, a touch screen that is provided integrally with a panel display, or a microphone that receives a sound input, but is not limited thereto and may be an arbitrary input interface. The input and output unit 30 includes an output interface that outputs information, which is generated by the navigation unit 35 or the control unit 36 or acquired from the server 10, to a user. The output interface includes, for example, a panel display that outputs information as a still image or a moving image, a head-up display, or a speaker that outputs information as sound, but is not limited thereto and may be an arbitrary output interface.

The communication unit 31 includes one or more communication modules. For example, each communication module may include a module corresponding to a mobile communication standard such as 4th generation (4G) and 5th generation (5G). The communication unit 31 may include a communication device such as a data communication module (DCM). The onboard device 11 is connected to the network 13 via the communication unit 31 and performs data communication with the server 10. The communication module includes a Global Positioning System (GPS) receiver module. The onboard device 11 receives GPS signals via the communication unit 31.

The storage unit 32 includes one or more memories. Each memory included in the storage unit 32 may be, for example, a semiconductor memory, a magnetic memory, or an optical memory, but is not limited thereto. Each memory may serve as, for example, a main storage device, an auxiliary storage device, or a cache storage device. The storage unit 32 stores arbitrary information which is used for operation of the onboard device 11. For example, the storage unit 32 may store control processing programs and embedded software.

The detection unit 33 includes, for example, various sensors that detect a vehicle speed, braking of a brake, acceleration, a steering angle, a yaw rate, and ON/OFF of automatic cruise control. The detection unit 33 supplies detection results from various sensors to the navigation unit 35 and the control unit 36 at predetermined intervals.

The imaging unit 34 realizes an imaging function of the onboard device 11. The imaging unit 34 includes one or more cameras that image scenes or subjects in front of the vehicle 14 in the travel direction, to the sides of the vehicle 14, and behind the vehicle 14. Each camera of the imaging unit 34 may be a monocular camera or a stereoscopic camera. The imaging unit 34 captures an image of a scene or a subject outside the vehicle, generates captured image data, and supplies the generated captured image data to the control unit 36.

The navigation unit 35 realizes the navigation function of the onboard device 11. The navigation unit 35 includes one or more processors that perform processes associated with route guidance. The navigation unit 35 acquires map information from the storage unit 32 and acquires a user's input information from the input and output unit 30. The navigation unit 35 acquires a current position (for example, latitude and longitude) of the vehicle 14 which is detected by the control unit 36 from the control unit 36. The navigation unit 35 presents information for route guidance to a user via the input and output unit 30 based on the user's input information, the current position, and the like. The navigation unit 35 acquires removal state information of a road obstacle and captured image data from the server 10 via the communication unit 31 and presents the acquired information and data to a user via the input and output unit 30.

The control unit 36 includes one or more processors. Each processor is a general-purpose processor or a dedicated processor specialized in a specific process, but is not limited thereto. For example, an electronic control unit (ECU) which is mounted in the vehicle 14 may function as the control unit 36. The control unit 36 comprehensively controls the operation of the onboard device 11. The control unit 36 also has a clocking function of acquiring a current time.

Figure 4A:
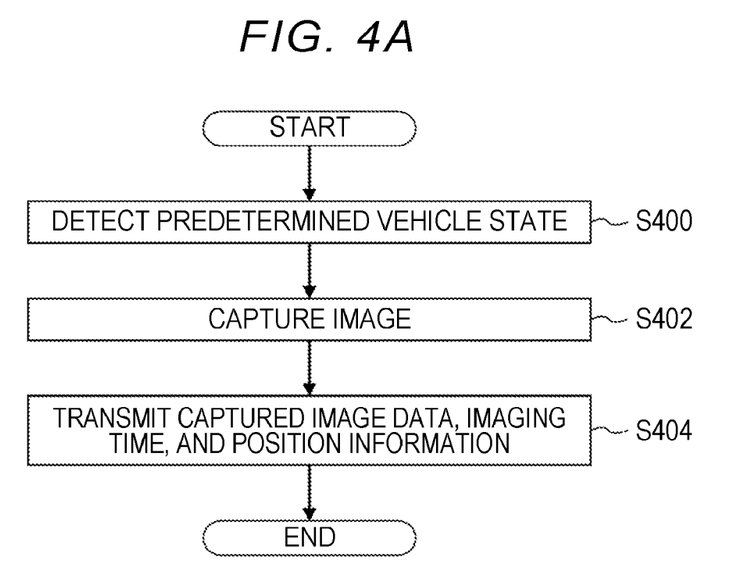
FIG. 4A is a flowchart illustrating an operation routine of the onboard device.
Figure 4B:
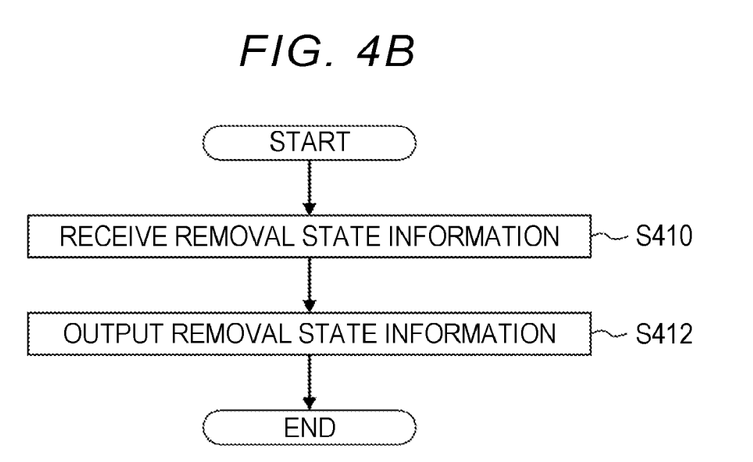
FIG. 4B is a flowchart illustrating an operation routine of the onboard device.
Figure 5:
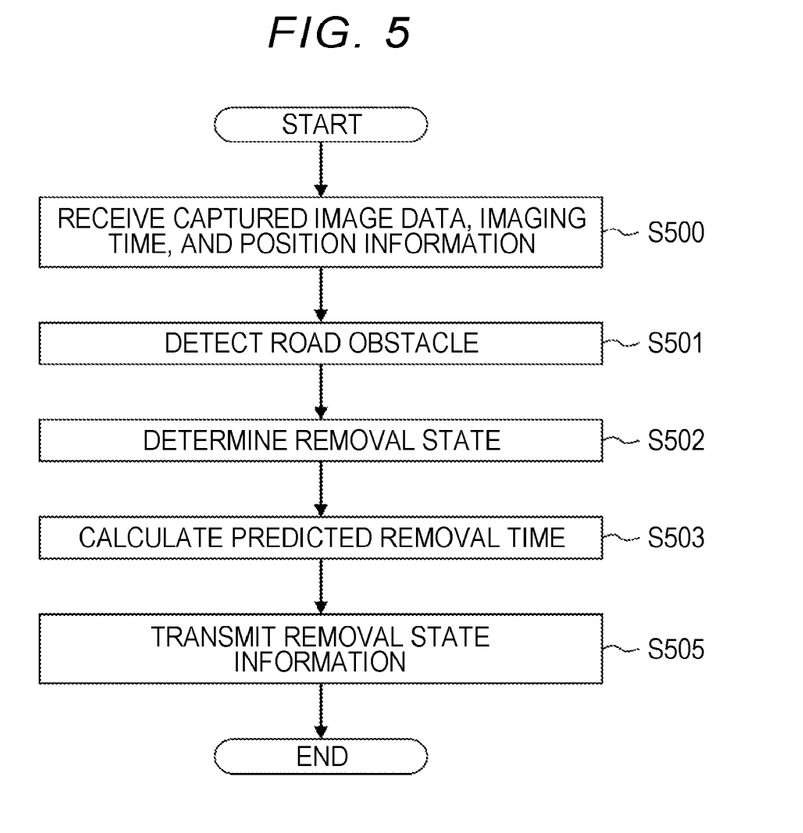
FIG. 5 is a flowchart illustrating an operation routine of the server.
Figure 7:
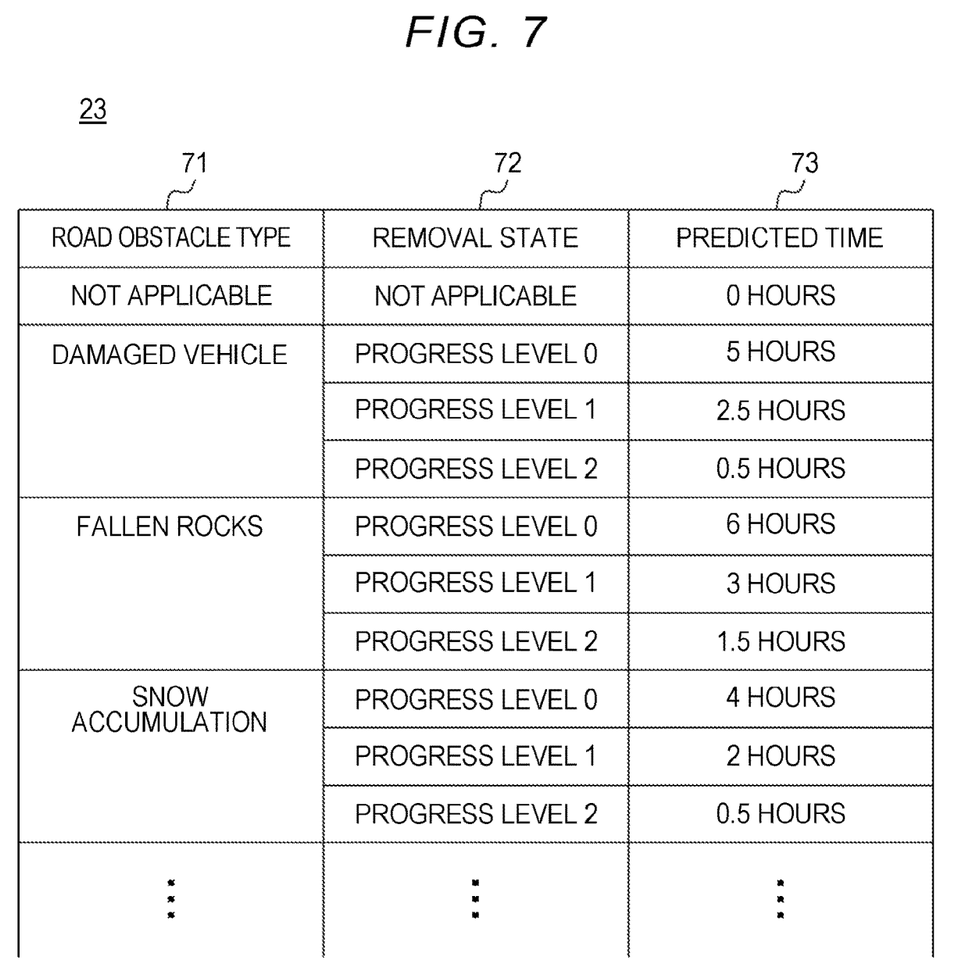
FIG. 7 is a diagram illustrating an example of a removal time DB.
Figure 8:
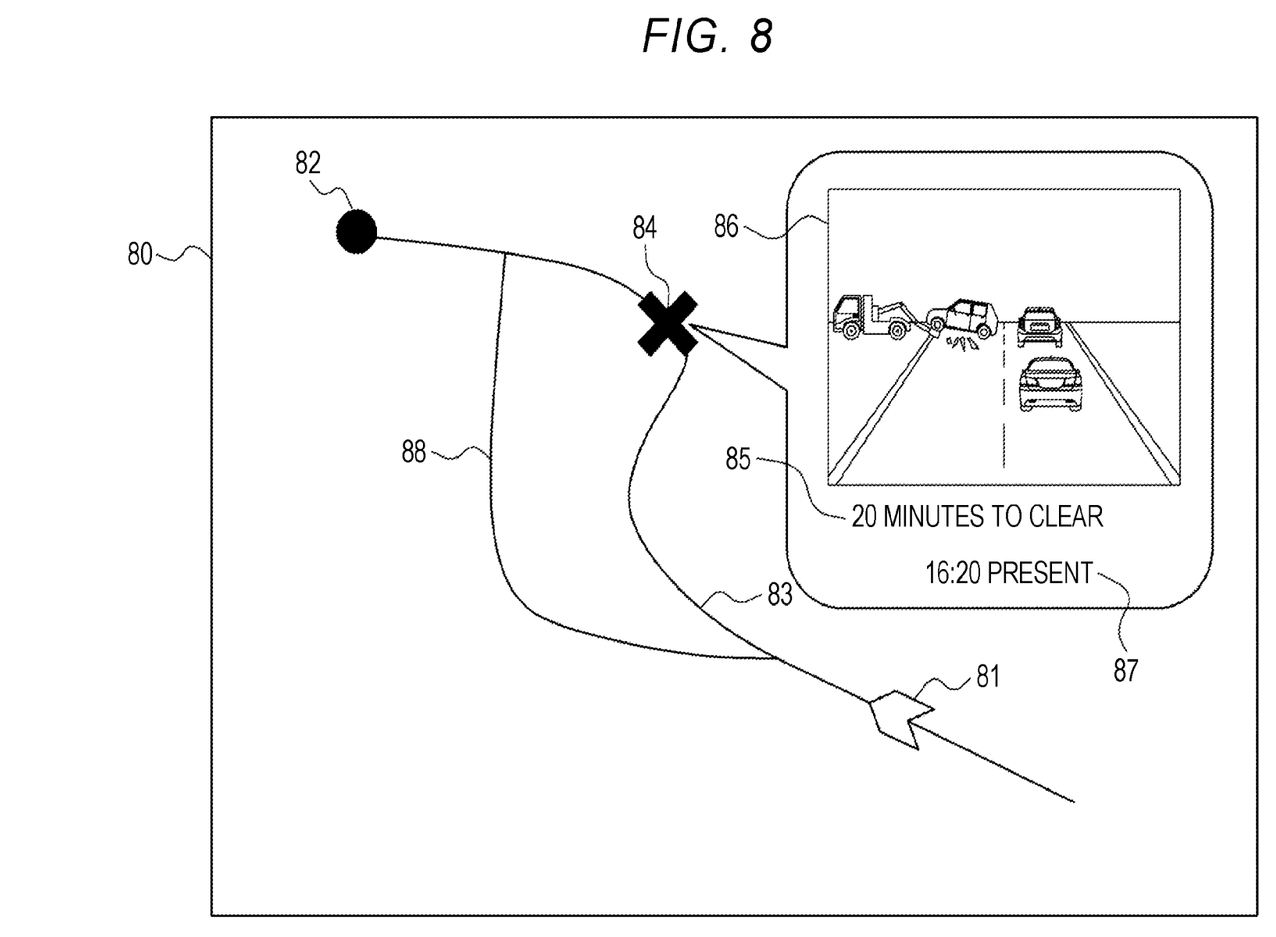
FIG. 8 is a diagram illustrating a display example of removal state information.

The operation of the information providing system 1 will be described below with reference to FIGS. 4A to 8. FIGS. 4A, 4B, and 5 are flowcharts illustrating the operation of the information providing system 1 according to this embodiment. FIGS. 4A and 4B illustrate operation routines of the onboard device 11. FIG. 5 illustrates an operation routine of the server 10. FIGS. 6A to 6D illustrate examples of captured image data in front of the vehicle 14 in the travel direction. FIG. 7 illustrates an example of the removal time DB 23. FIG. 8 illustrates a display example of removal state information or the like in the onboard device 11.

As illustrated in FIG. 4A, the onboard device 11 detects a predetermined vehicle state (operation S400). The predetermined vehicle state is, for example, operation of a brake, low-speed travel (for example, in which the vehicle speed is equal to or lower than 5 km/h), acceleration from a stopped state or a substantially stopped state, use of automatic cruise control, or a combination thereof that can indicate that the vehicle is caught in a traffic jam. For example, the control unit 36 acquires detection results from the detection unit 33 at predetermined intervals (for example, several milliseconds to several seconds) and detects a vehicle state indicating a traffic jam. An arbitrary method such as machine learning may be used to detect the vehicle state indicating a traffic jam.

When the predetermined vehicle state is detected, the onboard device 11 images surroundings of the vehicle (operation S402). For example, the control unit 36 instructs the imaging unit 34 to capture an image and the imaging unit 34 images a scene or a subject outside the vehicle. For example, when the vehicle is located in the vicinity of the head of a traffic jam section, there is a high likelihood that a captured image will include a road obstacle which is a factor for a traffic jam as the scene or subject outside the vehicle. Examples of the road obstacle include a damaged vehicle, fallen rocks, a fallen tree, a snow accumulation, or a large dead animal.

Subsequently, the onboard device 11 transmits captured image data, an imaging time, and position information to the server 10 (operation S404). In the onboard device 11, the control unit 36 acquires captured image data from the imaging unit 34 and acquires an imaging time using the internal clocking function. The control unit 36 acquires GPS signals from the communication unit 31 at the time of imaging and detects the current position of the vehicle 14 from the GPS signals. Then, the control unit 36 transmits the captured image data, the imaging time, and the detected position information to the server 10 via the communication unit 31.

As illustrated in FIG. 5, the server 10 receives the captured image data, the imaging time, and the position information from the onboard device 11 (operation S500). In the server 10, for example, the control unit 22 receives the captured image data, the imaging time, and the position information from the onboard device 11 via the communication unit 20. The server 10 acquires a plurality of pieces of captured image data which is imaged by other onboard devices 11 passing each position on a map and which are temporally continuous by causing the onboard devices 11 of a plurality of vehicles 14 to periodically perform operations S400 to S404.

Then, the server 10 detects a road obstacle from the captured image data at each position (operation S501) and determines a removal state of the road obstacle (operation S502). Then, the server 10 generates removal state information including a predicted time which is required to remove the road obstacle depending on the type of the road obstacle and the removal state (operation S503). The control unit 22 of the server 10 that generates removal state information by performing operations S501 to S503 corresponds to a "removal state information generating unit."

The removal state information generating unit detects an object on a road or in the vicinity of the road from a captured image for each position on the road by an image recognition process such as edge recognition or pattern recognition of an image, for example, based on position information incidental to captured image data. Then, the removal state information generating unit detects a road obstacle from the captured image and determines the type of the road obstacle. The removal state information generating unit determines a removal state of the road obstacle from the captured image. The removal state is determined in one to several operations for each type of road obstacles. An arbitrary method such as machine learning may be used for an image recognition process on the captured image data. The removal state information generating unit acquires a predicted time which is required to remove a road obstacle based on the type and the removal state of the road obstacle from the removal time DB 23.

Figure 6A:
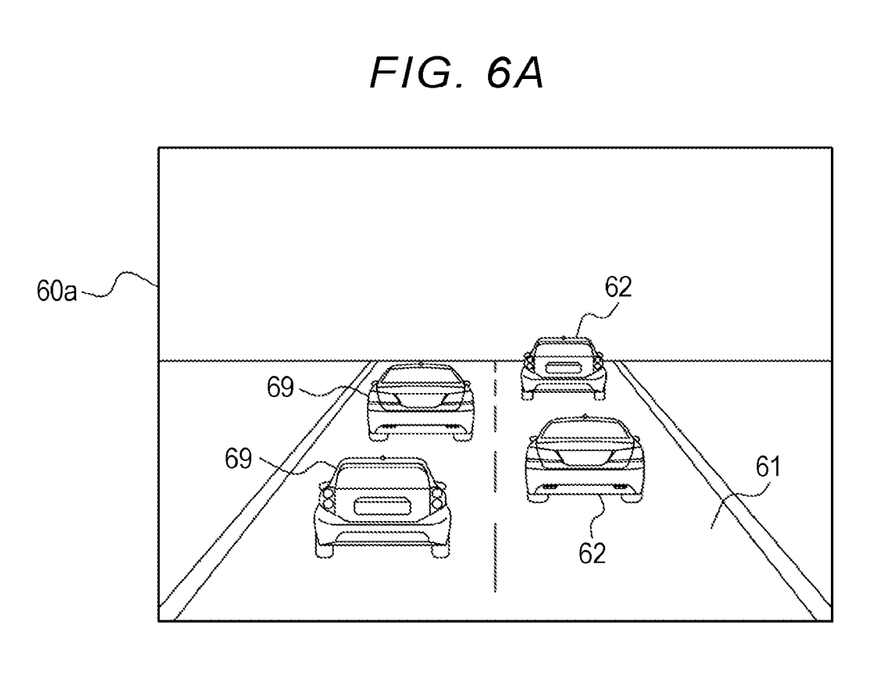
FIG. 6A is a diagram illustrating an example of a captured image.
Figure 6B:
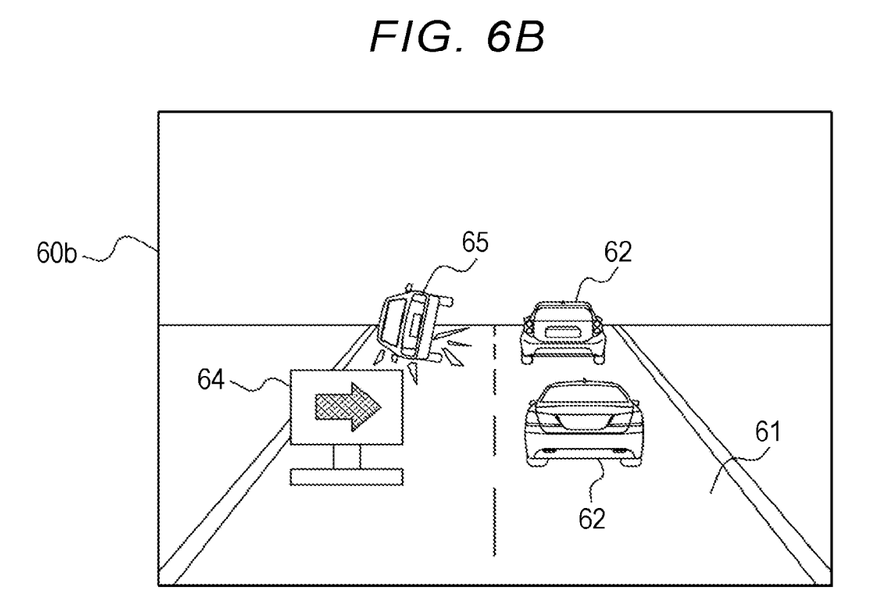
FIG. 6B is a diagram illustrating an example of a captured image.
Figure 6C:
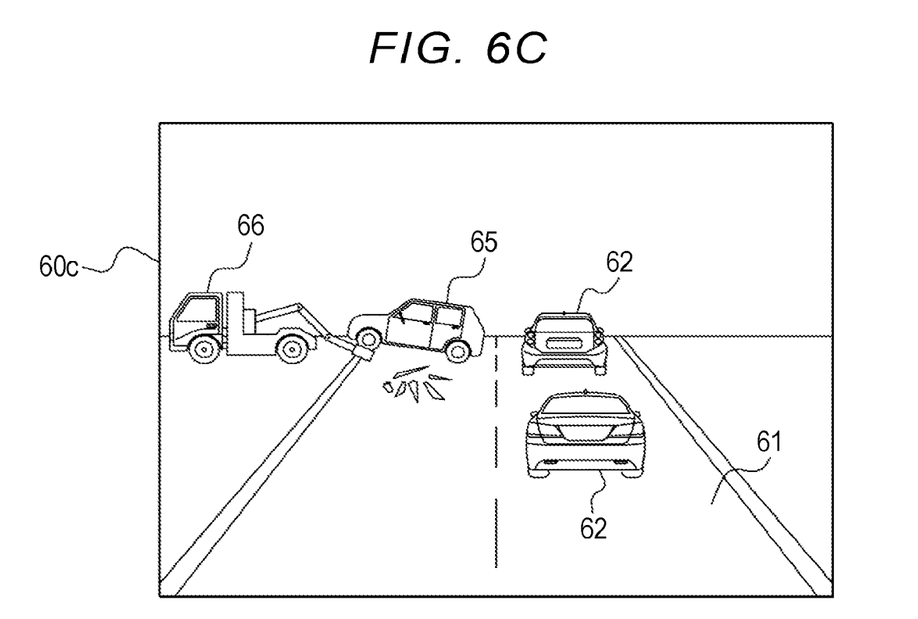
FIG. 6C is a diagram illustrating an example of a captured image.
Figure 6D:
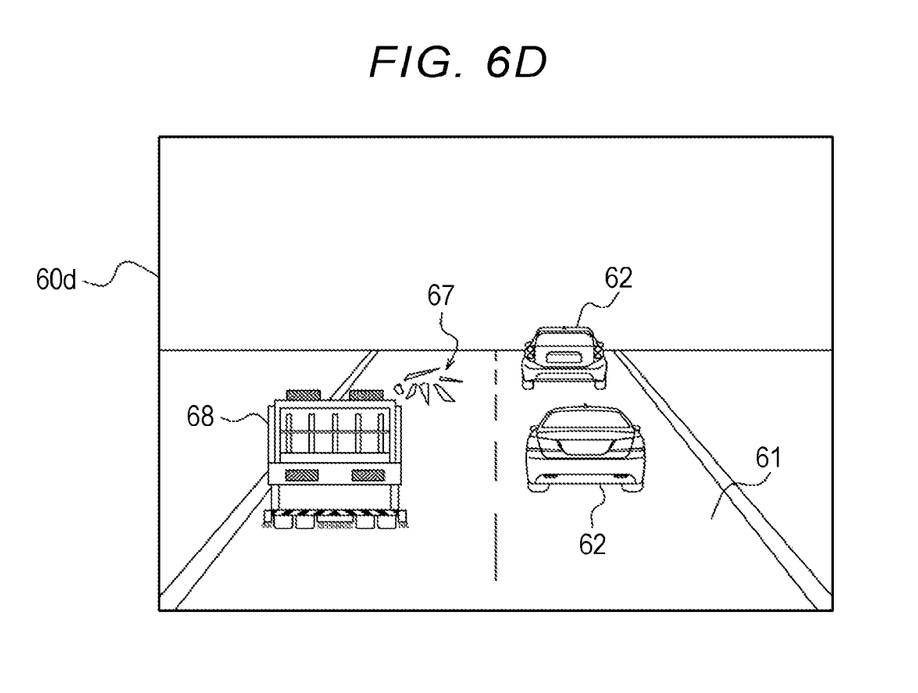
FIG. 6D is a diagram illustrating an example of a captured image.

FIGS. 6A to 6D illustrate examples of a captured image in a traffic jam which is captured based on a characteristic vehicle state in the traffic jam by an onboard device 11 of a vehicle 14. FIG. 6A illustrates an example of a captured image in which a preceding vehicle is captured in a traffic jam, FIG. 6B illustrates an example of a captured image in which a road obstacle is captured, and FIGS. 6C and 6D illustrate examples of captured images in which work of removing a road obstacle is captured at the same position as illustrated in FIG. 6B.

In FIG. 6A, the removal state information generating unit detects preceding vehicles 62 in addition to a road 61 from a captured image 60*a*. Here, a road obstacle is not detected. That is, the captured image 60*a* is a captured image which is captured in a traffic jam section other than the vicinity of a road obstacle serving as a reason of the traffic jam. Accordingly, the removal state information generating unit determines, for example, that the type of a road obstacle is "not applicable" and the removal state is "not applicable."

In FIG. 6B, the removal state information generating unit detects a road obstacle 65 in addition to the road 61 and the preceding vehicles 62 from a captured image 60*b*. That is, the captured image 60*b* is a captured image which is captured in the vicinity of a road obstacle serving as a reason of the traffic jam. The removal state information generating unit distinguishes the road obstacle 65 from the preceding vehicles 62 and determines the type thereof. Here, it is assumed that the road obstacle 65 is a damaged vehicle. A damaged vehicle is identified based on a position on a road, a direction of a vehicle body, lighting of a hazard lamp, characteristic shapes due to crash, and the like. Conditions for identifying a damaged vehicle may be set to a condition that a sign 64 for lane guidance which is installed on a road is recognized and the vehicle is located within a predetermined distance (for example, within 20 meters to 30 meters) in a predetermined direction (for example, in front in the travel direction of the vehicle 14) from the sign 64. When the road obstacle 65 is fallen rocks, a fallen tree, a snow accumulation, a dead large animal, or the like, the removal state information generating unit identifies the road obstacle 65 by recognizing characteristic shapes or colors, the size of an image (for example, the number of lanes interfering with each other), and the like thereof. That is, past, that is, normal, captured image data at the same position may be stored, for example, in the storage unit 21, and the removal state information generating unit may digitize a difference from the captured image data in the past and determine whether there is a road obstacle by comparison of numerical values. At this time, the removal state information generating unit determines, for example, that a removal state is "progress level 0." The removal state information generating unit specifies the position at which the image is captured as the position of the road obstacle 65. In the subsequent processes, processing of captured image data which is captured at positions other than the position of the road obstacle 65 may be skipped.

In FIG. 6C, the removal state information generating unit detects a work vehicle 66 such as a wreck car or a truck for removing an obstacle in addition to a road obstacle 65 from a captured image 60*c*. In this way, when the work vehicle 66 in addition to the road obstacle 65 is detected, the removal state information generating unit determines, for example, that the type of a road obstacle is "damaged vehicle" and the removal state is "progress level 1." The work vehicle 66 may vary depending on the type of the road obstacle 65. For example, when the road obstacle 65 is a snow accumulation, the work vehicle 66 may be a snowplow vehicle.

In FIG. 6D, the removal state information generating unit detects a work vehicle 68 that cleans wreckage 67 after a road obstacle has been almost removed from a captured image 60*d*. For example, the wreckage 67 and the work vehicle 68 are detected by recognition of size and pattern of an image. When the work vehicle 68 is detected in this way, the removal state information generating unit determines, for example, that the type of a road obstacle is "damaged vehicle" and the removal state is "progress level 2." When the road obstacle 65 is a snow accumulation, whether there is a road obstacle 65 and whether there is wreckage 67 can be determined based on an amount of snow accumulation remaining. For example, when an amount of snow accumulation which is recognized from an image is greater than a predetermined amount, it may be determined to be the road obstacle 65. When the amount of snow accumulation is less than the predetermined amount, it may be determined to be the wreckage 67. In this case, a snowplow vehicle may be determined as the work vehicle 68.

When removal of the road obstacle 65 is completed and passage of vehicles is restored, the road state is returned to the state illustrated in FIG. 6A. At this time, the removal state information generating unit determines that the type of a road obstacle is "not applicable" and the removal state is "not applicable."

When the type and the removal state of the road obstacle 65 are determined, the removal state information generating unit acquires a predicted time which is required to remove the road obstacle and which corresponds to the type and the removal state of the road obstacle 65 with reference to the removal time DB 23. As illustrated in FIG. 7, in the removal time DB 23, for example, the predicted time 73 is correlated with the road obstacle type 71 and the removal state 72. The predicted time may be statistically calculated based on the past results or may be arbitrarily determined. For example, in the case illustrated in FIG. 6A, the road obstacle type 71 is "not applicable," the removal state 72 is "not applicable," and the corresponding predicted time 73 is "0 hours." For example, in the case illustrated in FIG. 6B, the road obstacle type 71 is "damaged vehicle," the removal state 72 is "progress level 0," and the corresponding predicted time 73 is "5 hours." For example, in the case illustrated in FIG. 6B, the road obstacle type 71 is "damaged vehicle," the removal state 72 is "progress level 1," and the corresponding predicted time 73 is "2.5 hours." For example, in the case illustrated in FIG. 6C, the road obstacle type 71 is "damaged vehicle," the removal state 72 is "progress level 2," and the corresponding predicted time 73 is "0.5 hours."

Referring back to FIG. 5, the server 10 transmits removal state information including a position of a road obstacle and a predicted time to the onboard device 11 (operation S505). The removal state information may include captured image data at a time point at which the removal state information is generated or an imaging time in addition thereto. For example, the control unit 22 causes the communication unit 20 to transmit the generated removal state information.

As illustrated in FIG. 4B, the onboard device 11 receives the removal state information and the captured image data from the server 10 (operation S410) and outputs the received data (operation S412). For example, the control unit 36 of the onboard device 11 outputs the removal state information as an image to the panel display of the input and output unit 30. For example, the onboard device 11 may display the predicted time included in the removal state information or may display a captured image and an imaging time in addition thereto. The routine illustrated in FIG. 4B may be performed by an onboard device 11 which is mounted in a vehicle 14 other than the onboard device 11 that performs the routine illustrated in FIG. 4A. In this case, the onboard device 11 that performs the routine illustrated in FIG. 4A and the onboard device 11 that performs the routine illustrated in FIG. 4B may not include all the elements illustrated in FIG. 3. Even when the host vehicle 14 is not caught in a traffic jam, the onboard device 11 can present a removal state of a road obstacle to a user using an imaging result from the vehicle 14 which travels in the vicinity of the road obstacle serving as a reason of an existing traffic jam via the server 10.

As illustrated in FIG. 8, the onboard device 11 displays and outputs route information which is generated by the navigation unit 35 as, for example, a route guidance screen 80 via the input and output unit 30 when guidance for a route to a destination from a current position is performed by the navigation unit 35. A current position 81, a destination 82, and a route 83 are displayed on a map of the route guidance screen 80. When the onboard device 11 receives removal state information when there is a road obstacle, a position 84 of the road obstacle, a predicted time 85 which is required for removal thereof, and an imaging time 87 are additionally displayed on the route guidance screen 80. Here, for example, a case in which the predicted time which is required to remove the road obstacle is 20 minutes is illustrated. The position 84 of the road obstacle or the predicted time 85 may be output by sound. A captured image 86 may be displayed at the time of stopping in which driving is not affected. In this way, for example, since a user of the vehicle 14 can ascertain the predicted time which is required for completion of removal of the road obstacle from the removal state information and intuitively ascertain the removal state of the road obstacle from the captured image, it is possible to reduce concern that a user will feel stress.

When the position 84 of the road obstacle is located on the route 83, the navigation unit 35 searches for an alternative route 88 and presents the searched alternative route to a user before the vehicle is caught in a traffic jam in the vicinity of the road obstacle. In this way, by acquiring captured image data from a vehicle 14 which already travels in the vicinity of the road obstacle from the server 10, information capable of contributing to avoidance of a traffic jam can be supplied in advance from the server 10.

In the information providing system 1, the onboard device 11 and the server 10 can update a removal state of a road obstacle based on a captured image varying with time and present the updated removal state to a user by periodically performing the routines illustrated in FIGS. 4A, 4B, and 5. For example, when the removal state information generating unit determines a removal state (operation S503 in FIG. 5), the removal state information generating unit can newly determine the removal state and update the predicted time based on a variation with time from a captured image which has been used for previous determination to a captured image at the current time point, for example, based on a variation such as appearance of the road obstacle 65 at the time of transition from FIG. 6A to FIG. 6B, appearance of the work vehicle 66 at the time of transition from FIG. 6B to FIG. 6C, or appearance of the work vehicle 68 at the time of transition from FIG. 6C to FIG. 6D.

For example, detection of a road obstacle (operation S501) and determination of a removal state (operation S502) in the operation routine of the server 10 described above with reference to FIG. 5 may be performed by the onboard device 11. In this case, by performing operations S501 and S502 after operation S402 in FIG. 4A, the control unit 36 of the onboard device 11 may transmit detection results or the like to the server 10 and the server 10 may calculate the predicted time (operation S503).

While the disclosure has been described above in conjunction with all the drawings and embodiments, it should be noted by those skilled in the art that various modifications and changes can be easily made based on the present disclosure. Accordingly, it should be noted that such modifications and changes are included in the scope of the disclosure. For example, the functions included in the units or the operations can be rearranged without logical inconsistency and a plurality of units or operations may be combined into one unit or an operation or may be divided. In this embodiment, the control unit 22 of the server 10 and the control unit 36 of the onboard device 11 read a program in which routines for performing the above-mentioned operations are described from the storage units 21 and 32 and execute the read program. Accordingly, the programs causing the control unit 22 of the server 10 and the control unit 36 of the onboard device 11 to perform operations in this embodiment are included in the scope of the disclosure. The information providing system 1 may include a mobile terminal having the same function as the onboard device 11 instead of the onboard device 11.

The network 13 in this embodiment includes an ad hoc network, a local area network (LAN), a metropolitan area network (MAN), a cellular network, a wireless personal area network (WPAN), a public switched telephone network (PSTN), a terrestrial wireless network, an optical network, another network, or a combination of some thereof in addition to the above-mentioned examples. Examples of elements of a wireless network include an access point (for example, a Wi-Fi access point) and a femtocell. A wireless communication device can be connected to a wireless network using Bluetooth (registered trademark), Wi-Fi (registered trademark), cellular communication techniques, or other radio techniques and technical standards.

In this way, various aspects of the present disclosure can be embodied in many different embodiments and such embodiments are included in the scope of the present disclosure.

What is claimed is:

1. An information providing system comprising:
 a server;
 an onboard device configured to transmit and receive information to and from the server,
 wherein the onboard device includes an imaging unit configured to capture an image around a vehicle and a first transmission unit configured to transmit position information and captured image data to the server,
 wherein the server includes circuitry configured to:
  determine a type of a road obstacle and a removal state of the road obstacle based on the captured image data,
  calculate a predicted time that is required to remove the road obstacle based on the type of the road obstacle and the removal state of the road obstacle, and
  generate removal state information including the predicted time; and
 a second transmission unit configured to transmit the removal state information,
 wherein the road obstacle includes at least one object that is not operable and is incapable of moving on its own,
 wherein the type of the road obstacle includes a type of the at least one object that is not operable and is incapable of moving on its own, and wherein the removal state of the road obstacle includes one of a plurality of progress levels of removal of the road obstacle, and wherein the removal state information which is transmitted from the server is output in another onboard device.

2. The information providing system according to claim 1, wherein the removal state information includes a position of the road obstacle.

3. The information providing system according to claim 1, wherein the circuitry is further configured to update the predicted time based on a variation with time of the captured image data.

4. The information providing system according to claim 1, wherein the onboard device further includes a navigation unit configured to perform guidance for a route based on the removal state information.

5. The information providing system according to claim 1, wherein the road obstacle is at least one of a damaged vehicle, fallen rocks, a fallen tree, snow accumulation, or a large dead animal.

6. The information providing system according to claim 1, wherein the type of the at least one object that is not operable and is incapable of moving on its own includes at least one of a damaged vehicle, fallen rocks, and snow accumulation.

7. A server comprising:
a reception unit configured to receive position information and captured image data of a captured image around a vehicle, which is captured by an onboard device in a predetermined vehicle state, from the onboard device;
circuitry configured to:
determine a type of a road obstacle and a removal state of the road obstacle based on the captured image data,
calculate a predicted time that is required to remove the road obstacle based on the type of the road obstacle and the removal state of the road obstacle, and
generate removal state information including the predicted time,
wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle; and
a transmission unit configured to transmit the removal state information to another onboard device.

8. The server according to claim 7, wherein the circuitry is further configured to update the predicted time based on a variation with time of the captured image data.

9. An onboard device of a vehicle comprising:
an imaging unit configured to capture an image around the vehicle in a predetermined vehicle state; and
a transmission unit configured to transmit position information and captured image data to a server,
wherein the server is configured to:
determine a type of a road obstacle and a removal state of the road obstacle based on the captured image data,
calculate a predicted time that is required to remove the road obstacle based on the type of the road obstacle and the removal state of the road obstacle,
generate removal state information including the predicted time, and transmit the removal state information to another onboard device, wherein the removal state information is output in the other onboard device, wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle.

10. The vehicle comprising the onboard device according to claim 9.

11. An onboard device of a vehicle comprising:
a reception unit configured to receive, from a server, removal state information, which includes a predicted time that is required to remove a road obstacle and that is generated based on captured image data received from another onboard device by the server,
wherein the server is configured to:
determine a type of the road obstacle and a removal state of the road obstacle based on the captured image data,
calculate the predicted time that is required to remove the road obstacle based on the type of the road obstacle and the removal state of the road obstacle, and
generate the removal state information including the predicted time,
wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle; and
an output unit configured to output the removal state information.

12. The vehicle comprising the onboard device according to claim 11.

13. A non-transitory computer-readable storage medium configured to store a computer program causing a computer to perform:
causing an onboard device to capture an image around a vehicle in a predetermined vehicle state; and
causing the onboard device to transmit position information and captured image data to a server,
wherein the server is configured to:
determine a type of a road obstacle and a removal state of the road obstacle based on the captured image data,
calculate a predicted time that is required to remove the road obstacle based on the type of the road obstacle and the removal state of the road obstacle,
generate removal state information including the predicted time, and
transmit the removal state information to another onboard device, wherein the other onboard device outputs the removal state information, wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle.

14. A non-transitory computer-readable storage medium configured to store a computer program causing a computer to perform:
   causing an onboard device to receive, from a server, removal state information, which includes a predicted time that is required to remove a road obstacle and that is generated based on captured image data received from another onboard device by the server,
   wherein the server is configured to:
      determine a type of the road obstacle and a removal state of the road obstacle based on the captured image data,
      calculate the predicted time that is required to remove the road obstacle based on the type of the road obstacle and the removal state of the road obstacle, and
      generate the removal state information including the predicted time,
   wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle; and
   causing the onboard device to output the removal state information.

15. An information providing method comprising:
   causing an onboard device, which transmits and receives information to and from a server, to transmit position information and captured image data around a vehicle to the server;
   causing the server to:
      determine a type of a road obstacle and a removal state of the road obstacle based on the captured image data,
      calculate a predicted time that is required to remove the road obstacle based on the type of the road obstacle and the removal state of the road obstacle, and
      generate removal state information including the predicted time,
   wherein the road obstacle includes at least one object that is not operable and is incapable of moving on its own, wherein the type of the road obstacle includes a type of the at least one object that is not operable and is incapable of moving on its own, and wherein the removal state of the road obstacle includes one of a plurality of progress levels of removal of the road obstacle; and
   causing the server to transmit the removal state information to another onboard device, the other onboard device outputting the removal state information.

* * * * *